United States Patent
Michelsen et al.

(10) Patent No.: US 7,578,430 B2
(45) Date of Patent: Aug. 25, 2009

(54) LOYALTY PROGRAM ENROLLMENT SYSTEMS AND METHODS

(75) Inventors: Michael J. Michelsen, Arvada, CO (US); Anthony Scillieri, Pequannock, NJ (US); Michael Hafer, Highlands Ranch, CO (US)

(73) Assignees: First Date Corporation, Greenwood Village, CO (US); The Western Union Company, Englewood, CO (US)

( * ) Notice: Subject to any disclaimer, the term of this patent is extended or adjusted under 35 U.S.C. 154(b) by 309 days.

(21) Appl. No.: 11/007,649

(22) Filed: Dec. 6, 2004

(65) Prior Publication Data

US 2006/0118611 A1  Jun. 8, 2006

(51) Int. Cl.
*G06F 17/00* (2006.01)
*G06Q 30/00* (2006.01)
(52) U.S. Cl. .................................. 235/375; 705/14
(58) Field of Classification Search ............... 235/375, 235/385, 382; 705/5, 22
See application file for complete search history.

(56) References Cited

U.S. PATENT DOCUMENTS

| | | | | |
|---|---|---|---|---|
| 5,689,100 A | * | 11/1997 | Carrithers et al. | 235/380 |
| 2001/0018660 A1 | * | 8/2001 | Sehr | 705/5 |
| 2001/0034720 A1 | * | 10/2001 | Armes | 705/65 |
| 2001/0054003 A1 | * | 12/2001 | Chien et al. | 705/14 |
| 2003/0069856 A1 | | 4/2003 | Seifert et al. | |
| 2003/0158818 A1 | | 8/2003 | George et al. | |
| 2004/0117249 A1 | * | 6/2004 | Wang et al. | 705/14 |

* cited by examiner

*Primary Examiner*—Daniel A Hess
(74) *Attorney, Agent, or Firm*—Townsend and Townsend and Crew LLP

(57) ABSTRACT

Systems and methods for enrolling customers in loyalty programs include receiving, at a loyalty program host, transaction information for a transaction initiated by a customer and determining whether the transaction information includes a customer loyalty number associated with a loyalty program. If the transaction information does not include the customer loyalty number, a loyalty enrollment process is initiated to automatically enroll the customer in the loyalty program.

42 Claims, 7 Drawing Sheets

LOYALTY PROGRAM ENROLLMENT SYSTEMS AND METHODS

BACKGROUND OF THE INVENTION

A variety of loyalty programs are offered to consumers. Loyalty programs usually offer an incentive designed to encourage customers to conduct business with one organization rather than a competitor organization. One type of loyalty program takes the form of a point system in which a customer is credited with a number of points for each transaction and is entitled to exchange a certain number of points for goods, services, or other rewards. Another type of loyalty program offers customers associated with the loyalty program a discount on items, which may be designated by the merchant.

An example of the first type of loyalty program is a frequent flyer program offered by an airline. An airline typically offers some number of points to each customer that is correlated with the distance traveled. At certain levels, the points may be exchanged by the customer for airline tickets. In some cases, additional incentives may be used to induce customers to reach certain point levels, such as by providing preferential seating and booking privileges. Similar loyalty systems are used in environments for the sale of goods or services, with customers of a particular organization being entitled to rewards in exchange for certain levels of business.

Examples of the second type of loyalty program, in which a customer participating in a loyalty program is offered a discount, include loyalty programs offered by grocery organizations. A grocery store organization may offer a discount on designated items to customers having a loyalty program account. In some cases, the loyalty program may also offer the customers other rewards or benefits when the customer reaches certain levels of business with the grocery store organization.

Customers wishing to enroll in any of these types of loyalty programs are required to provide detailed information to the organization offering the loyalty program. This can be a time consuming process. Thus, customers may decline to enroll in loyalty programs and may therefore have no incentive to conduct business with a particular organization.

BRIEF SUMMARY OF THE INVENTION

Methods, systems, and machine-readable mediums are disclosed for automatically enrolling customers in loyalty programs. In one embodiment, the method comprises receiving transaction information for a transaction initiated by a customer. The transaction may be any type of transaction, such as a retail transaction for the sale of goods, a transaction for the purchase of airplane tickets, a money transfer transaction, or other transaction. A determination is made whether the transaction information includes a customer loyalty number associated with a loyalty program. If the transaction information does not include the customer loyalty number, the loyalty program host initiates a process to automatically enroll the customer in the loyalty program.

In some instances, the customer may be automatically enrolled in the loyalty program. The automatic enrollment may include obtaining a new loyalty number. The new loyalty number may be associated with a customer identifier, which may be obtained from the transaction information. By way of example, the customer identifier may be one or more of a phone number, a credit card account number, a debit card account number, a checking account number, or other type of customer account number associated with the transaction. A message may be transmitted indicating the new loyalty number.

In further embodiments, the method may comprise adding a number of loyalty points for the transaction to a loyalty program balance associated with the customer loyalty number associated with the transaction information or an automatically generated customer loyalty number. Alternatively, or additionally, a discount may be provided for one or more items associated with the transaction based on the customer loyalty n umber or automatically generated customer loyalty number.

If the customer is associated with a previously assigned loyalty number, the loyalty enrollment process may be terminated. By way of example, the determination that the customer has a previously assigned loyalty number may comprise comparing a customer identifier associated with the transaction information to a plurality of stored customer identifiers associated with loyalty numbers. If a match exists between the customer identifier and one of the stored customer identifiers, the loyalty enrollment process is terminated. A message may be transmitted indicating loyalty rewards forfeited because of failure to use the previously assigned loyalty number.

In other aspects, the method may comprise determining whether one or more criteria associated with automatic enrollment are satisfied. For example, one criteria may be whether the merchant associated with the transaction participates in automatic loyalty program enrollment. As another example, a criteria may be whether the transaction qualifies for automatic enrollment. Other criteria may include determining whether the transaction qualifies for loyalty program rewards or points, or whether a valid identifier is associated with the transaction information. If the criteria are not satisfied, the loyalty enrollment process may be terminated.

In still further embodiments, the method may comprise providing a customer interface to loyalty program information. The customer interface may include an interface to obtain additional customer information to associate with an automatically assigned customer loyalty number. Another interface that may be included is an interface to link a first customer loyalty number with a second customer loyalty number.

In a second embodiment, a system is disclosed which comprises a communications interface, to receive transaction information for a transaction initiated by a customer. Logic is communicatively coupled with the communications interface. The logic is configured to automatically enroll the customer in a loyalty program if one or more criteria are satisfied. A data store, communicatively coupled with the logic, stores loyalty account information for a plurality of customers.

BRIEF DESCRIPTION OF THE DRAWINGS

Illustrative embodiments in accordance with the invention are illustrated in the drawings in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
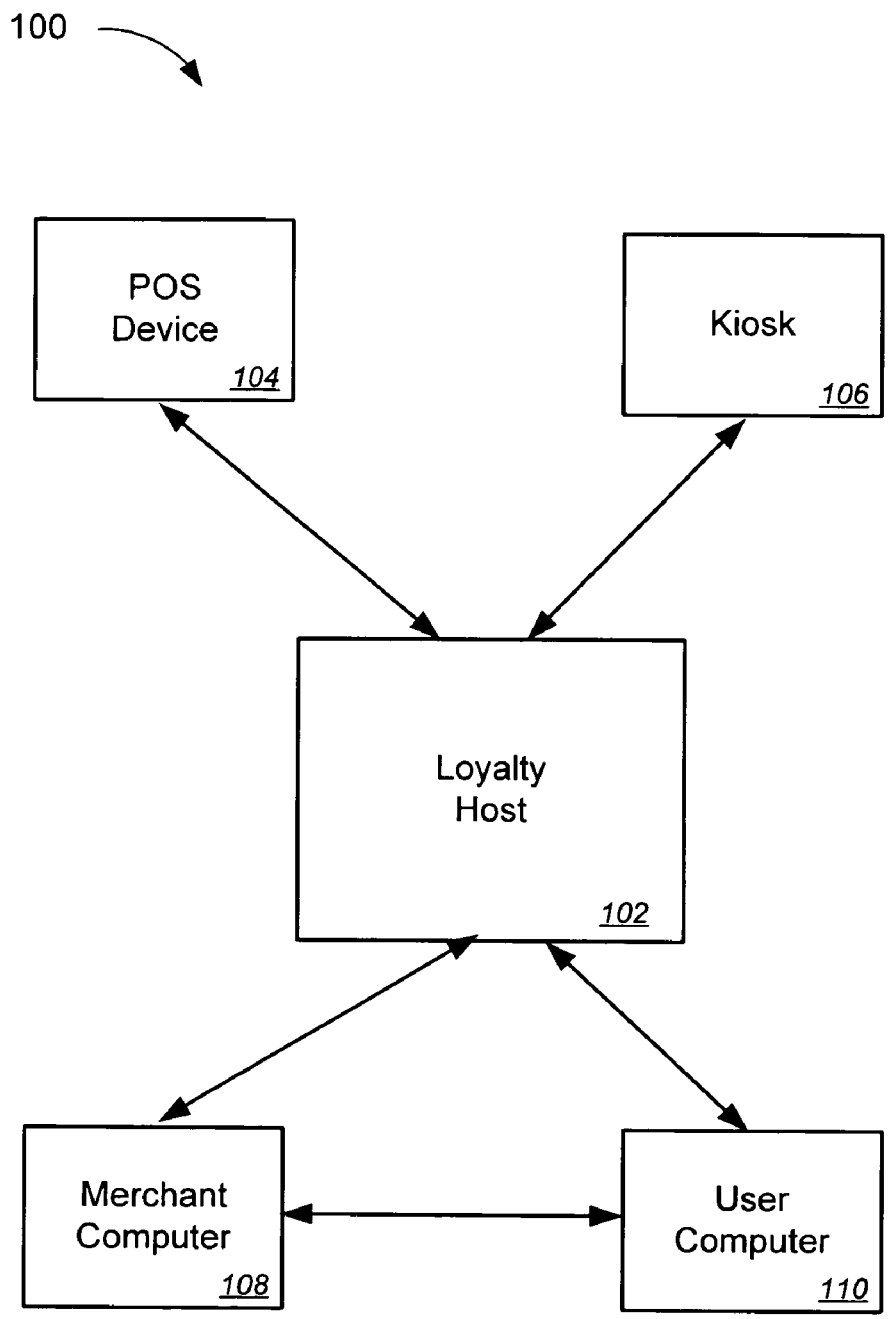
FIG. 1 illustrates an exemplary embodiment of a loyalty system.

FIG. 1 illustrates an exemplary embodiment of a loyalty system 100. In one embodiment, the loyalty system 100 may operate for a plurality of merchants related by a merchant association. Merchants in the merchant association may provide a variety of different types of goods or services to customers. As will be described in further detail below, the merchant association may offer a loyalty program to customers to provide incentives for doing business with merchants in the association. In an alternative embodiments, loyalty system 100 may operate on behalf of an issuer association or a plurality of issuer associations. Further details of such loyalty systems may be found in application Ser. No. 10/079,927, entitled "Systems and Methods for Operating Loyalty Programs", filed on Feb. 19, 2002, the details of which are hereby incorporated by reference.

Customers may be able to initiate a transaction with a merchant in any of a number of different ways. For example, a customer may initiate a transaction with a merchant by walking into a retail location and purchasing goods and services. A customer may also be able to initiate a transaction with a merchant via a kiosk terminal 104. As a third example, a customer may initiate a transaction (e.g., an Internet transaction to purchase goods or services) via a user computer 108 communicatively coupled with a merchant server 106.

Details of the transaction may be transmitted by point-of-sale device 102 located at a retail location, kiosk 104, and/or merchant computer 106 to a transaction system 110 for processing. Transaction system 110 may include one or more machines (not shown) that perform transaction authorization and settlement functions on behalf of the merchant.

Transaction system also includes a loyalty host 112 to administer a loyalty program for a merchant, a merchant association in which the merchant is a member, an issuer association in which the merchant is a member, or plurality of issuer associations, one of which the merchant is a member. In some instances, loyalty host 104 may be a component of the one or more machines included in the transaction system 110 performing other functions. Alternatively, loyalty host 112 may be a standalone system receiving transaction details from another component of transaction system 110. As will be described in further detail below, loyalty host 112 may be used to automatically enroll customers in a loyalty program.

In one embodiment, a merchant may offer services to perform money transfer transactions. The customer may initiate a money transfer transaction by walking into a merchant location and providing details of the money transfer transaction to an agent. Money transfer transaction details may include recipient information, money transfer amount, and/or information about the customer (sender), such as a telephone number. The agent may enter the details into a point-of-sale (POS) device 102. When all the details have been entered, the POS device 102 may transmit the transaction information to a transaction host 110 for processing. Alternatively, the customer may initiate a money transfer transaction at kiosk 104 or user computer 108. Further details of exemplary money transfer transactions and systems are disclosed in application Ser. No. 09/975,171, entitled "Method and System for Performing Money Transfer Transactions, filed on Oct. 10, 2001, the details of which are hereby incorporated by reference.

In alternative embodiments, merchants may offer other goods or services. By way of example, merchants participating in loyalty system 100 may sell goods, such as clothing, toys, or other types of goods or provide services, such as travel services (airline tickets, rental cars, etc.).

The type of loyalty program administered by loyalty host 112 may vary depending upon the goods or services offered by merchants participating in the loyalty program. For instances, a loyalty program for merchants providing money transfer transactions may offer customers incentives, such as service fee discounts, telephone minutes (e.g., to telephone recipient regarding money transfer), or other rewards after a customer has accrued a certain number of points correlated to the amount of business done with the organization. A loyalty program for airlines may offer free airplane tickets or other incentives after a customer has accrued a certain number of points (e.g., miles traveled) correlated to the amount of business done with the airline. As a third example, a loyalty program for a grocery store or other type of retail chain may offer customers discounts (e.g., on designated goods) or other types of rewards, such as free products when a certain number of loyalty points have been accrued. Other types of loyalty programs may also be administered by loyalty host 112. In some embodiments, loyalty host 112 may administer a variety of different types of loyalty programs on behalf of one or more merchants, merchant associations, or issuer associations.

It should be appreciated that in alternative embodiments, loyalty system 100 may include additional or fewer components than illustrated. For instances, loyalty system 100 may not include kiosk 104 and/or merchant computer 106 and user computer 108. As another example, loyalty host 112 may be communicatively coupled with a plurality of different transaction systems, each providing transaction processing services for different merchants, merchant associations, or issuer associations. Other variations are also contemplated.

Figure 2:
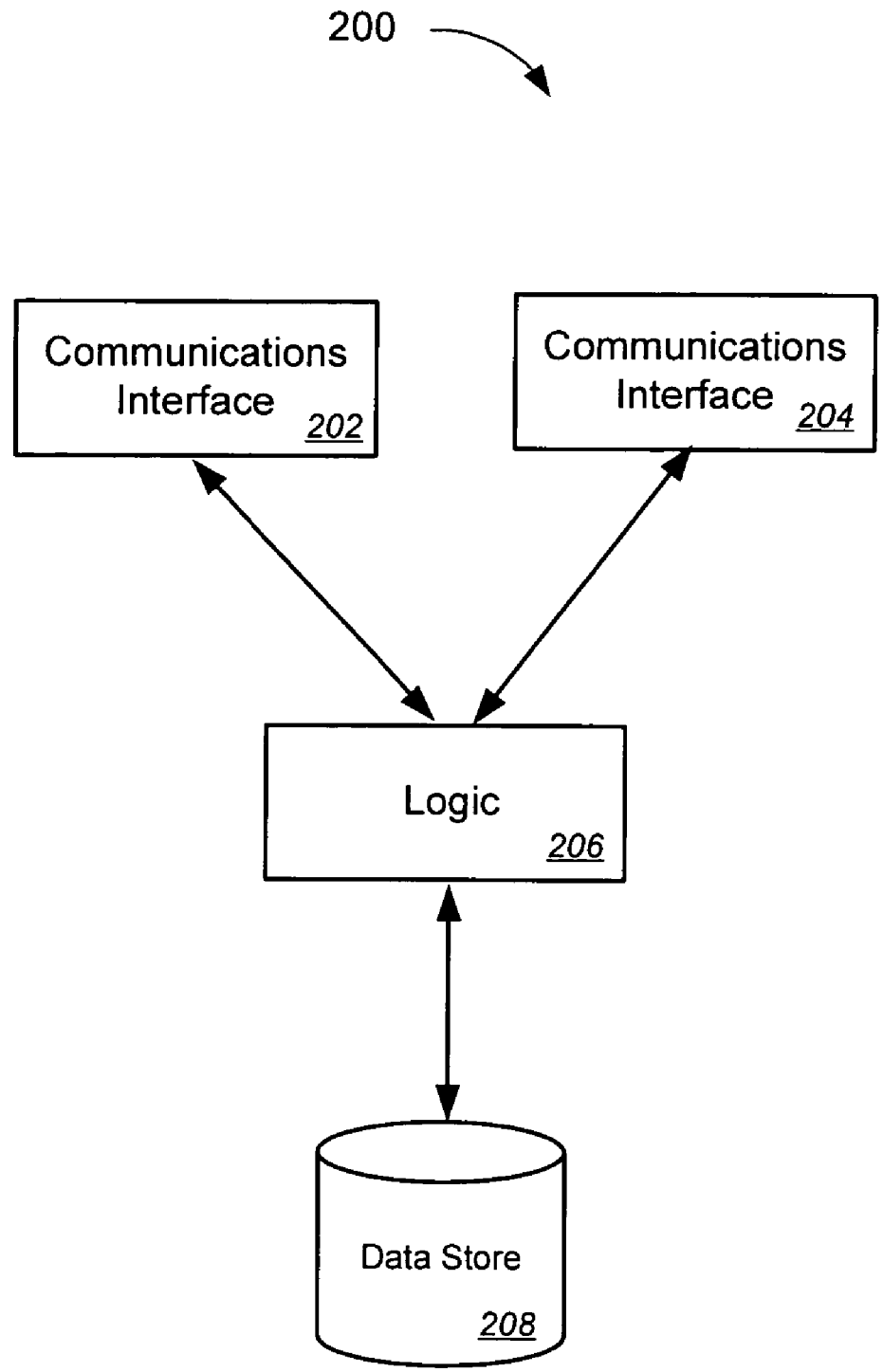
FIG. 2 is a block diagram of an exemplary loyalty host that may automatically enroll customers in a loyalty program.

FIG. 2 illustrates an exemplary embodiment of a loyalty program host 200 that may automatically enroll customers in a loyalty program. Loyalty program host 200 may include logic 206 communicatively coupled with one or more communications interfaces 202, 204 and data store 208. A communicative coupling is a coupling that allows communication between the components. This coupling may be by means of a bus, cable, network, wireless mechanism, program code call (e.g., modular or procedural call) or other mechanism that allows communication between the components. Thus, it should be appreciated that logic 206 or components of logic 206 and data store 208 may reside on the same or different physical devices.

One or more communications interfaces 202, 204 may be used to receive transaction information for transactions initiated by customers. Each communication interface 202, 204 may be a different type of communication interface. By way of example, communication interfaces 202 may be an interface to a proprietary network in communications with POS devices, kiosks, and/or other components of a transaction system, and communication interface 204 may be an interface to a Wide Area Network (WAN), such as the Internet. Alternative or additional types of communications interfaces 202, 204 may also be included as components of loyalty host 200.

Logic 206 may be one or more software programs, one or more components of a software program (e.g., function or program object), firmware, or other type of machine-executable instructions that may be used to automatically enroll customers in a loyalty. Logic 206 may also include instructions to administer the loyalty program. In some aspects, logic 206 may automatically enroll customers into a loyalty program if one or more criteria are satisfied. Logic 206 may use the transaction information to determine if the criteria are satisfied. Transaction information may also be used by logic to associate a customer identifier with a loyalty account number obtained during an automatic enrollment process. Additional details of the automatic enrollment process will be described in detail below with reference to FIGS. 4 and 5.

In some instances, logic 206 may also include instructions to provide user interface(s) to a customer to interact with loyalty host 200. For instance, a user interface (e.g., graphical user interface that may be provided to an Internet client) may be provided to allow a customer to view loyalty account balance information or other loyalty program information. A user interfaces may also be provided to allow a user automatically enrolled in a loyalty program to provide additional information about him or herself. Additional loyalty program incentives may be offered to users who provide the additional information. As a third example, a user interface may allow a user to link loyalty program account numbers. This may be useful if the user is automatically enrolled more than one time into the loyalty program for various reasons, such as association with transactions having different identifiers. In some cases, the loyalty program may also allow the association of loyalty account numbers for different members of a household.

It should be appreciated that logic 206 may perform additional functionality related to the management of loyalty program accounts. By way of example, various reports may be provided by logic 206 to merchants participating in a loyalty program. Further functionality that may be performed by a loyalty host 200 may be found in application Ser. No. 10/079,927, previously incorporated by reference.

Loyalty program account information may be stored in data store 208. Data store 208 may be one or more relational databases, spreadsheet(s), text file(s), internal software list(s), or other type of data structure(s) suitable for storing data. The loyalty program account information may include information for a plurality of customer loyalty accounts. By way of example, information for a loyalty account may include a loyalty account number, a loyalty account balance, and customer information (e.g., name, address, phone number). In some aspects, detailed information about a customer may not be available. In these instances, the loyalty account number may be associated with a customer identifier that may have been obtained from transaction information. For example, a customer identifier may be an account number presented for payment of the transaction (e.g., credit card account, debit card account, checking account), other type of account number, a phone number, or other type of information that may be used to identify a customer.

Other information may also be included in data store 208. This information may be used by logic 206 to determine whether a transaction qualifies for auto-enrollment, whether a merchant participates in automatic enrollment, the number of loyalty points to award for different transactions, and/or other information or criteria used to automatically enroll customers or administer the loyalty program. In cases in which loyalty host 200 administers more than one loyalty program, information for the additional programs may also be stored in data store 208.

Figure 3:
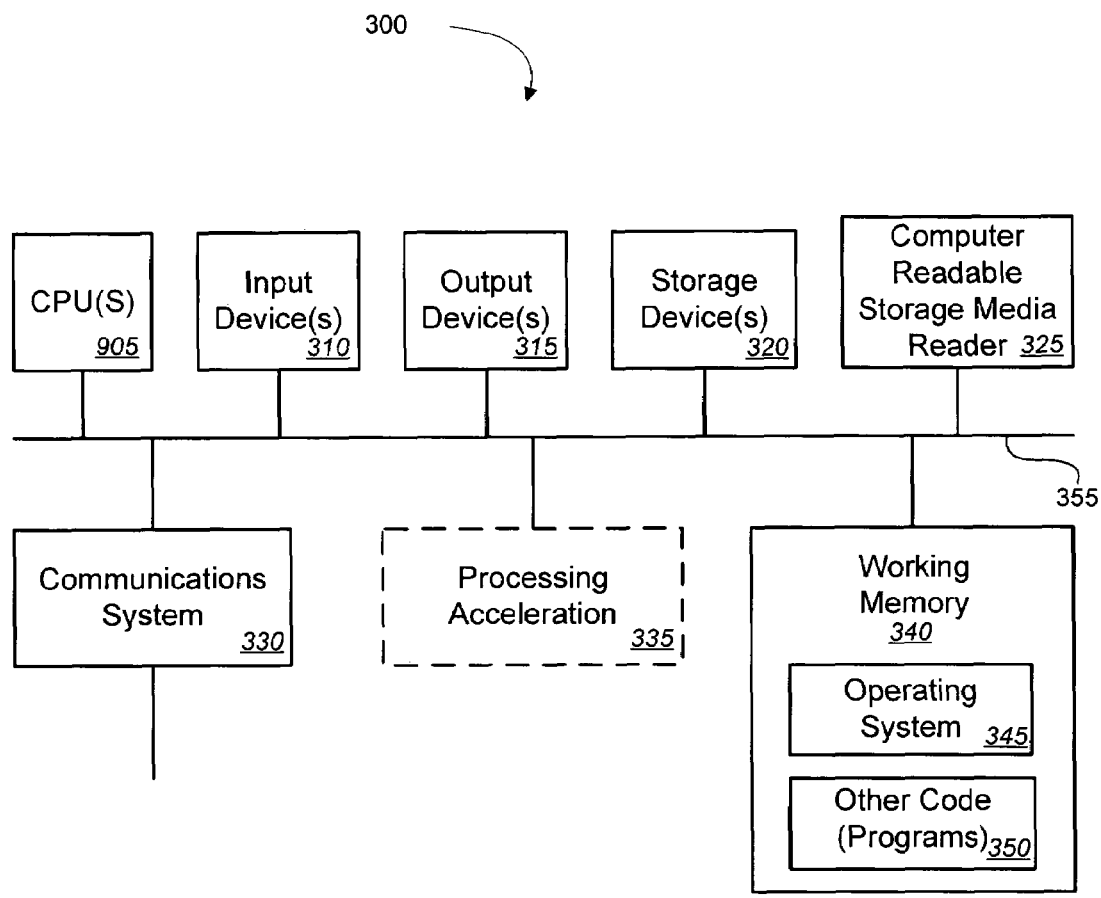
FIG. 3 is a block diagram of an exemplary computer system upon which a loyalty host may be implemented.

FIG. 3 illustrates one embodiment of a computer system 300 upon which a loyalty host may be implemented. The computer system 300 is shown comprising hardware elements that may be electrically coupled via a bus 355. The hardware elements may include one or more central processing units (CPUs) 305; one or more input devices 310 (e.g., a scan device, a mouse, a keyboard, etc.); and one or more output devices 315 (e.g., a display device, a printer, etc.). The computer system 300 may also include one or more storage device 920. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325; a communications system 330 (e.g., a modem, a network card (wireless or wired), an infra-red communication device, etc.); and working memory 340, which may include RAM and ROM devices as described above. In some embodiments, the computer system 300 may also include a processing acceleration unit 335, which can include a DSP, a special-purpose processor and/or the like.

The computer-readable storage media reader 325 can further be connected to a computer-readable storage medium, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with a network and/or any other computer or other type of device, such as a POS device or kiosk.

The computer system 300 may also comprise software elements, shown as being currently located within a working memory 340, including an operating system 345 and/or other code 350, such as an application program. The application programs may implement a framework, components of a framework, and/or the methods of the invention. It should be appreciate that alternate embodiments of a computer system 300 may have numerous variations from that described above. For example, customized hardware might also be used and/or particular elements might be implemented in hardware, software (including portable software, such as applets), or both. Further, connection to other computing devices such as network input/output devices may be employed.

Figure 4:
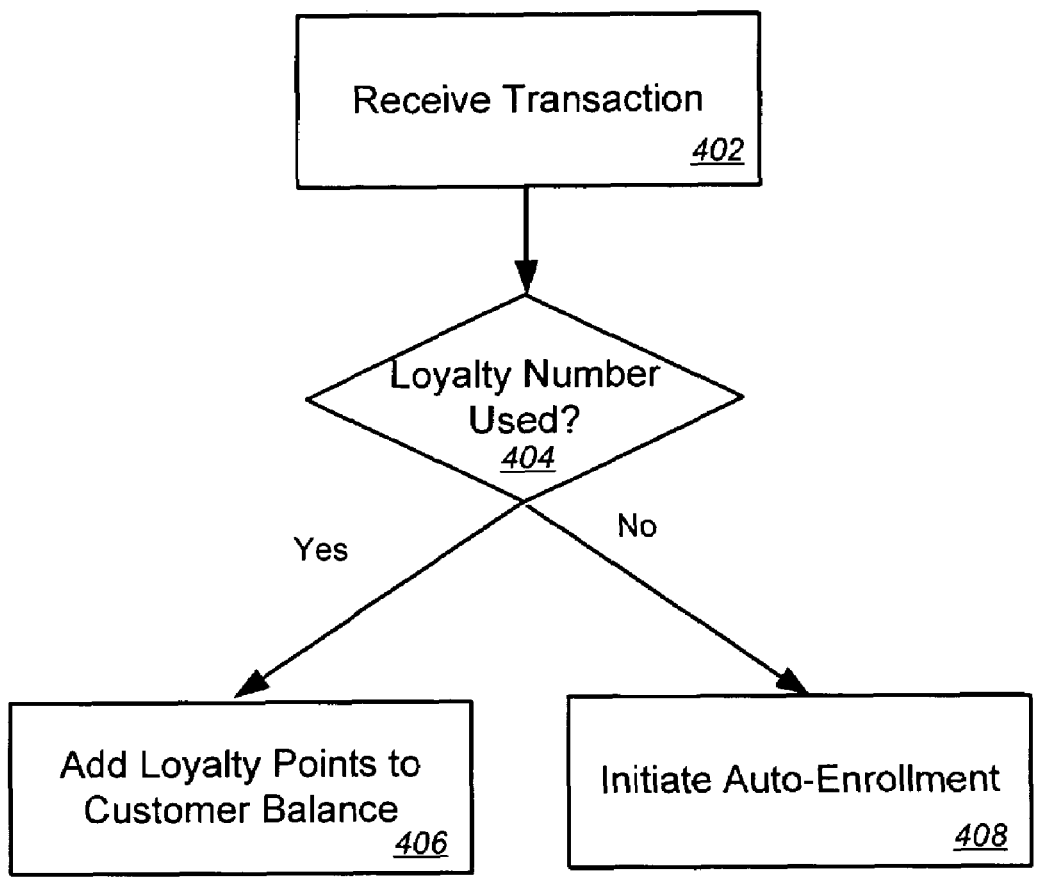
FIG. 4 is a flow diagram illustrating operation of a loyalty host according to one embodiment.

FIG. 4 is a flow diagram illustrating an exemplary operation of a loyalty host. The loyalty host may receive 402 transaction information for a transaction initiated by a customer. The transaction information may be received 402 from a POS device, a kiosk, a merchant computer, or other device. The transaction information may include details about the transaction. For example, in a money transfer transaction, the transaction information may include sender information (e.g., name, phone number, address), recipient information (name, phone number, etc.), amount of money to be transferred, and payment information. As another example, for a transaction involving the purchase of goods, the transaction information may include a sale amount, payment information, and optionally details about the goods purchased. In cases in which the customer presented his or her loyalty account number during the transaction for crediting of loyalty points and/or discounts, the transaction information may also include the customer loyalty number.

Loyalty host may determine 404 whether the transaction information includes a customer loyalty account number. If 404 the transaction information does include a customer loyalty account number, loyalty host may add 406 a number of loyalty points to the customer loyalty account based on the transaction details and loyalty program terms and/or provide other rewards or incentives in accordance with the terms of the loyalty program, such as a discount on designated goods. If 404 a customer loyalty account number is not included in the transaction information, the loyalty host may initiate 408 a process to automatically enroll the customer in the loyalty program.

Figure 5:
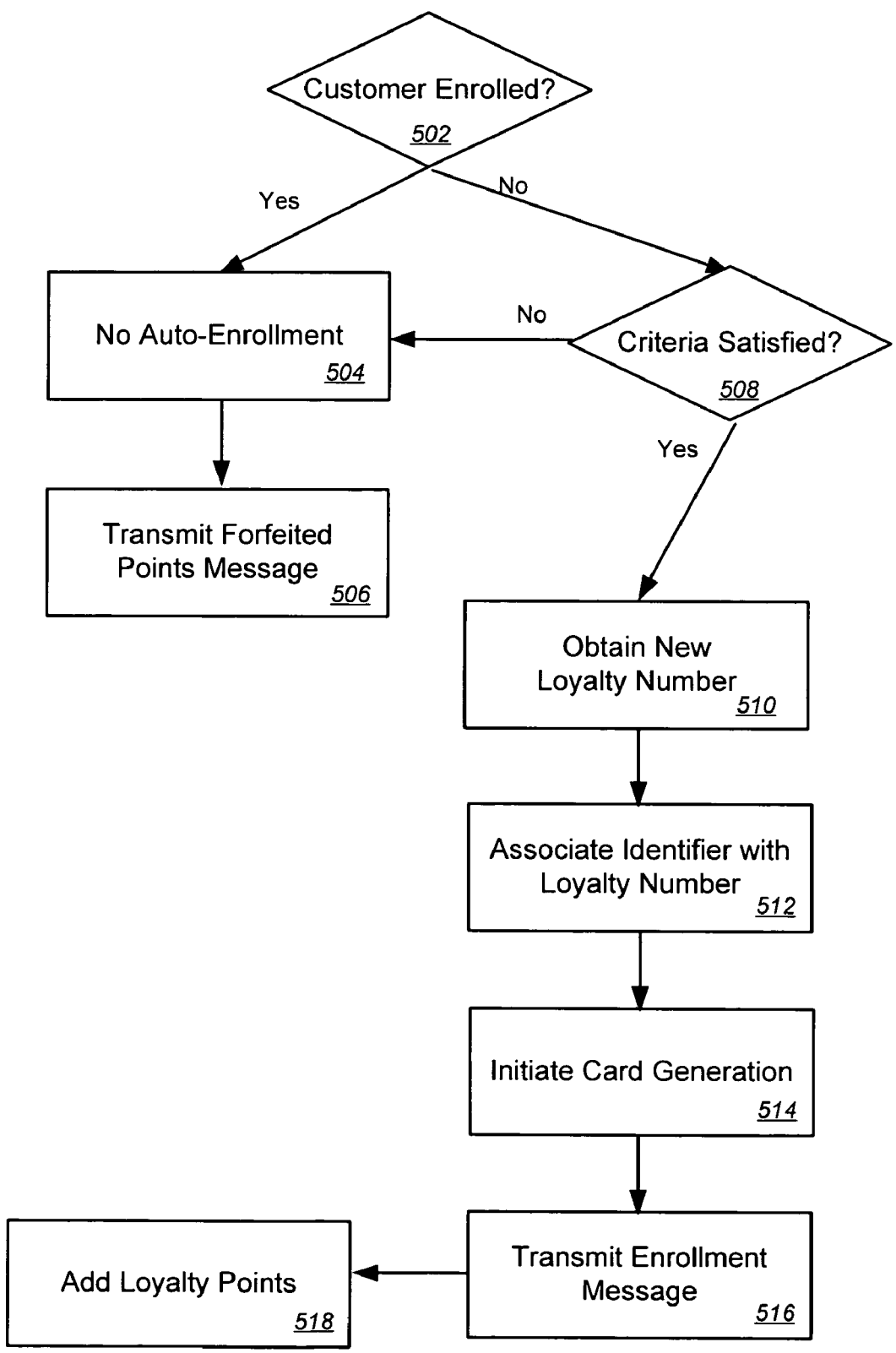
FIG. 5 is a flow diagram of an exemplary automatic enrollment process that may be used by a loyalty host.

FIG. 5 is a flow diagram of an exemplary automatic enrollment process that may be initiated by a loyalty host if transaction information does not include a loyalty number. The process may include determining 502 whether the customer was previously assigned a loyalty account number for the loyalty program. In one embodiment, the determination 502 may be made by comparing a customer identifier (e.g., payment account number, phone number, etc.) associated with the transaction information to a plurality of stored customer identifiers associated with assigned loyalty numbers. If a match exists, a determination 502 that the customer was previously enrolled. Other criteria may also be used to determine 502 whether the customer was previously enrolled. If 502 the customer was previously enrolled, the auto enrollment process may be terminated 504.

In some embodiments, a message may be transmitted 506 indicating the points or other rewards the customer forfeited by failing to use his or her loyalty number. The message may be transmitted 506 to a POS device or kiosk for printing on a customer receipt or may be transmitted to the customer computer. The message may also indicate to the customer that receipt of loyalty benefits requires use of the loyalty number. Alternatively, loyalty host may add loyalty points or provide other loyalty benefits to the customer even without use of the account number. Loyalty program may continue to allow the customer to obtain loyalty benefits without the use of the loyalty account number indefinitely or only for a predetermined number of times. A message may optionally be transmitted reminding the customer to use the loyalty account number for future transactions.

If the customer was not previously enrolled 502, a determination 508 may be made as to whether one or more criteria for automatic enrollment in the loyalty program are satisfied. Any number of criteria specified may be used. Exemplary criteria will be further illustrated with reference to FIG. 5 below. The automatic enrollment process may be terminated 504 if the predetermined criteria are not satisfied 508.

If the criteria for automatic enrollment are satisfied, the customer may be automatically enrolled in the loyalty program. A new loyalty number may be obtained 510 by the loyalty host (e.g., loyalty host may generate a new number). In some embodiments, the loyalty number may be generated by the loyalty host. A customer identifier or other information may be obtained from the transaction information and associated 512 with the new loyalty number. Alternatively, the customer identifier or portions of the customer identifier may be used as the loyalty number. By way of example, the track data on a debit or credit card, or part of the track data, may be used as the customer loyalty number. Thus, the inclusion of the customer identifier in the transaction information (e.g., presentation of an instrument having the identifier or portions of an identifier used as the loyalty number) may fulfill a requirement to present a loyalty account number in order to receive loyalty benefits.

For some types of transactions (e.g., money transfer, airline ticket purchase, rental car transaction), detailed information about the customer, such as name, address, and phone number, may be included in the transaction information. Any combination of this information may be associated 512 with the new loyalty number and stored in a data store. In other types of transactions, limited identifier information may be available in the transaction information. Some merchants may automatically collect a phone number with every transaction, that may be used as the identifier. Alternatively, or additionally, a customer account number, such as a credit card account number, a debit card account number, or a checking account number, may be used as the customer identifier. As previously described, the customer identifier may in some embodiments also be used as the customer's loyalty number.

In embodiments in which the transaction information does not include detailed customer information, the customer may be provided further incentives or rewards to provide more information to the merchant or loyalty program host. Loyalty program benefits may be limited until additional information is received.

Optionally, in instances in which a customer address is available or later becomes available, loyalty host may initiate 514 card generation to a card embossment facility. An enrollment message is transmitted 516 indicating the new loyalty number. The enrollment message may also specify further information about the loyalty program, request more information about the customer, and/or specify a location (e.g., a website) having more information about the loyalty program.

Loyalty host may also add 518 a number of loyalty points to an account balance associated with the newly created customer loyalty account based on the transaction details and loyalty program terms. Other rewards or incentives, such as a discount for items in the transaction may alternatively or additionally be provided. In an alternative embodiment, points may not be added 518 or other incentives may not be provided until a later transaction in which the customer presents the newly created loyalty number or until the customer provides more detailed information about him or herself.

Figure 6:
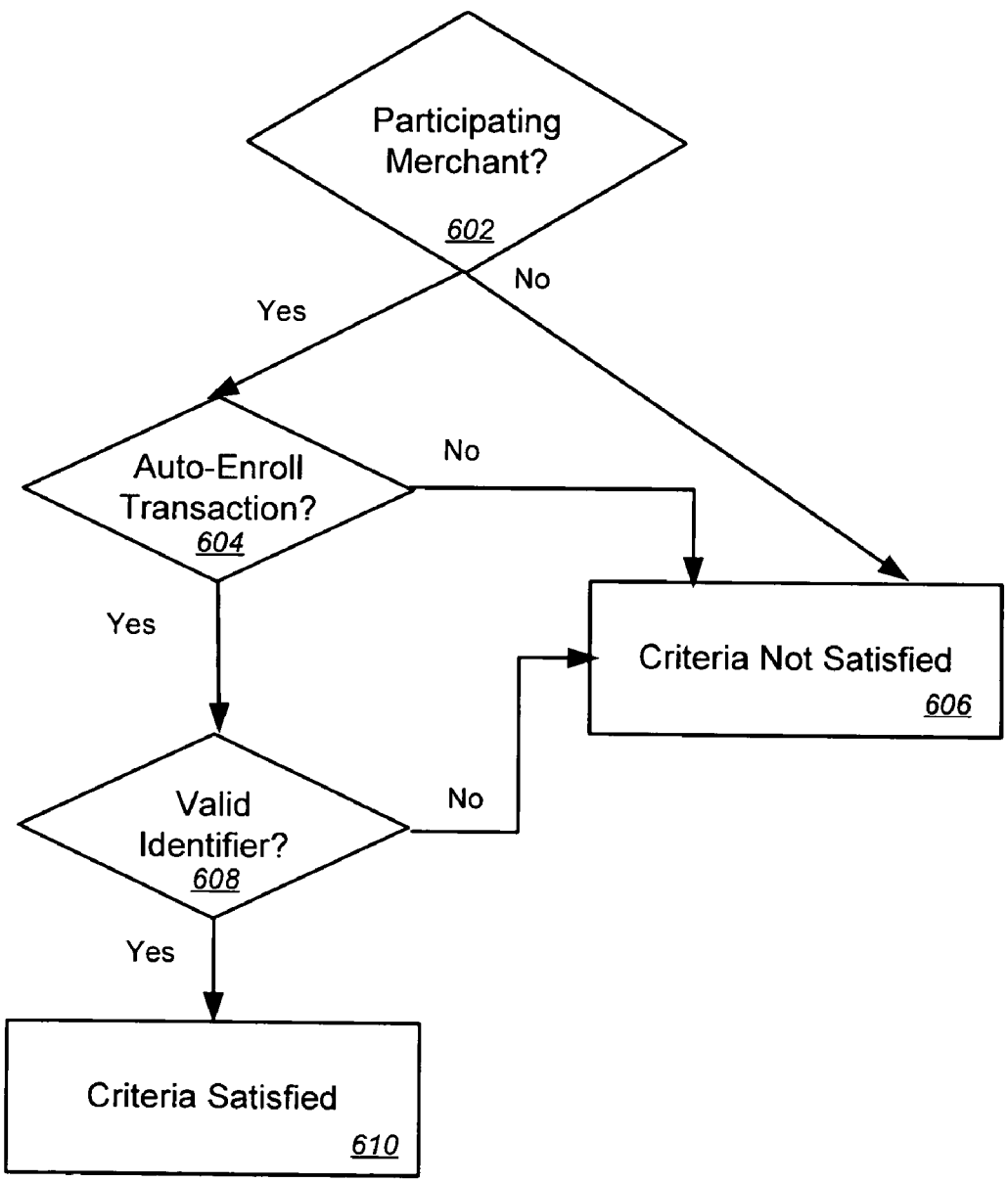
FIG. 6 is a flow diagram that may be used by an auto-enrollment process determine whether criteria for automatic enrollment are satisfied.

FIG. 6 is a flow diagram that may be used by an auto-enrollment process determine whether criteria for automatic enrollment are satisfied. One criteria for automatic enrollment may be whether the merchant participates in automatic enrollment in the loyalty program. Merchants may not wish to participate or may be prohibited from participated for any number of reasons. Loyalty host may determine 602 whether the merchant participates by comparing the merchant identifier to a data store having information about participating merchants. Alternatively, the transaction information may indicate whether the merchant is a participating merchant. If 602 the merchant associated with the transaction does not participate in automatic enrollment, the criteria for automatic enrollment are not satisfied.

Another criteria that may be evaluated 604 by the loyalty host is whether the transaction is a transaction that qualifies for automatic enrollment. The transaction may not qualify for a variety of reasons. For instance, the transaction may be a dollar amount threshold for automatic enrollment in the loyalty program. As another example, only certain types of transactions, such as certain types of money transfers or purchase of designated goods, may qualify for automatic enrollment in the loyalty program. Transactions that do not qualify for loyalty benefits even if a loyalty account number was presented (e.g., purchase of goods not designated to receive loyalty rewards or program points, purchases under a certain dollar amount) may also not be eligible for automatic enrollment. If the transaction does not meet the criteria for automatic enrollment, a determination 606 may be made the criteria for automatic enrollment are not satisfied.

A third example of criteria that may be used is whether there is a valid identifier 608 associated with the transaction. In some cases, such as a cash transaction for the sale of goods, no identifying information may be available to associate a customer identifier with a loyalty number. In other cases, an identifier provided in the customer transaction information may be determined to be invalid (e.g., an invalid phone number). If no identifying information is available or invalid identifying information is provided, loyalty host may determine 606 the criteria for automatic enrollment are not satisfied. Alternatively, loyalty host may allow anonymous customers and may therefore enroll the customer. If anonymity is not allowed, the loyalty host may generate a loyalty number and transmit a message with the loyalty number indicating future benefits may be made available if the customer provides more detailed information. The future benefits may include loyalty points or rewards from the current transaction, awarded after the customer provides identifying information.

It should be appreciated that the criteria illustrated in FIG. 6 are exemplary in nature only. Alternative embodiments may use additional, fewer, or alternative criteria to suit the particular needs of the loyalty program.

Figure 7:
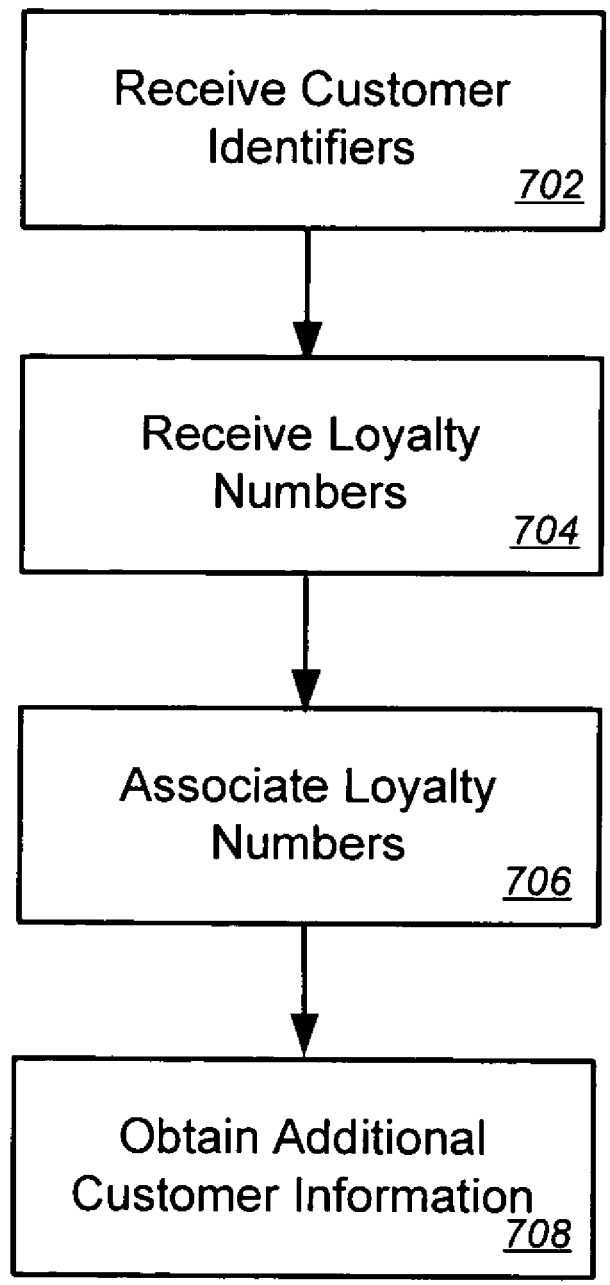
FIG. 7 is a flow diagram illustrating an exemplary interaction of a customer with a user interface that may be provided by a loyalty host.

FIG. 7 is a flow diagram illustrating an exemplary interaction of a customer with a user interface that may be provided by a loyalty host. The user interface may be provided by a loyalty host to allow the customer to manage his or her loyalty account or accounts and/or to obtain additional information about the customer.

In an exemplary interaction, the customer may have been assigned more than one loyalty program account number. For example, more than one account number may have been assigned if a customer used a different account number to pay for a transaction and inadvertently neglected to present the previously assigned loyalty account number. Loyalty host may then receive 702, via user interface, the customer identifiers 702 associated with the different loyalty account numbers. In some instances, the loyalty account numbers may alternatively or additionally be received 704. In another embodiment, the loyalty account numbers may be retrieved by loyalty host from a data store. Loyalty host may then associate 706 the loyalty account numbers with each other, so that points associated with the loyalty accounts are added together for purposes of reward or benefit determination. In a different embodiment, one of the loyalty accounts may be deleted and a loyalty point balance may be transferred to the other account.

User interface may also be used to obtain 708 additional information about the customer, such as name and address. In some cases, the additional information may be required for the user to receive full or any of the benefits of the loyalty program. The additional information may then be associated with a loyalty account number which was automatically assigned to the customer.

The illustration in FIG. 7 is intended to be exemplary in nature only. In alternative embodiments, other interactions may be performed by a user. For instances, loyalty host may not allow loyalty numbers to be associated 706 with each other. As another example, the user interface may allow the customer to receive account balance or other loyalty program information, redeem rewards, or otherwise manage his or her loyalty account. A similar or different user interface may be provided to merchants to enter information or obtain information on behalf of customers or to provide loyalty program information designed for the merchant.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
    providing, with a loyalty program host, a customer interface to loyalty program information;
    receiving, at the loyalty program host, transaction information for a transaction initiated by a customer, the customer having a previously registered account relationship with an account provider;
    determining whether the transaction information includes a customer loyalty number associated with a loyalty program; and
    initiating, at the loyalty program host, a loyalty enrollment process to automatically enroll the customer in the loyalty program if the transaction information does not include the customer loyalty numbers,
    wherein providing the customer interface includes providing an interface to link the customer loyalty number with a second customer loyalty number.

2. The method of claim 1, further comprising automatically enrolling, with the loyalty program host, the customer in the loyalty program.

3. The method of claim 2, wherein automatically enrolling the customer comprises obtaining a new loyalty number.

4. The method of claim 3, further comprising:
    obtaining a customer identifier to identify the customer; and
    associating the customer identifier with the new customer loyalty number.

5. The method of claim 4, wherein obtaining the customer identifier comprises obtaining the customer identifier from the transaction information.

6. The method of claim 4, wherein obtaining the customer identifier comprises obtaining a phone number.

7. The method of claim 4, wherein obtaining the customer identifier comprises obtaining a customer account number associated with the transaction.

8. The method of claim 7, wherein the customer account number comprises one of a credit card account number, a debit card account number, and a checking account number.

9. The method of claim 3, further comprising:
    transmitting a message indicating the new loyalty number.

10. The method of claim 1, further comprising adding a number of loyalty points for the transaction to a loyalty program balance associated with one of the customer loyalty number or an automatically generated customer loyalty number.

11. The method of claim 1, further comprising providing a discount for one or more items associated with the transaction based on one of the customer loyalty number or an automatically generated customer loyalty number.

12. The method of claim 1, further comprising:
    determining, with the loyalty program host, the customer is associated with a previously assigned loyalty number; and
    terminating the loyalty enrollment process.

13. The method of claim 12, wherein determining the customer is associated with a previously assigned loyalty number comprises:
    comparing a customer identifier associated with the transaction information to a plurality of stored customer identifiers, each customer identifier associated with an assigned loyalty number; and
    determining a match exists between the customer identifier and one of the stored customer identifiers.

14. The method of claim 12, further comprising transmitting a message indicating loyalty rewards forfeited because of failure to use the previously assigned loyalty number.

15. The method of claim 1, further comprising:
    determining, with the loyalty program host, whether one or more criteria associated with automatic enrollment are satisfied; and
    terminating the loyalty enrollment process without enrolling the customer if the one or more criteria are not satisfied.

16. The method of claim 15, wherein determining whether one or more criteria associated with automatic enrollment are satisfied comprises determining whether a merchant associated with the transaction is a participant in automatic loyalty program enrollment.

17. The method of claim 15, wherein determining whether one or more criteria associated with automatic enrollment are satisfied comprises determining whether the transaction qualifies for automatic enrollment.

18. The method of claim 17, wherein determining whether the transaction qualifies for automatic enrollment comprises if the transaction is not qualified for at least one of loyalty program rewards or loyalty program points, determining the transaction does not qualify for automatic enrollment.

19. The method of claim 15, wherein determining whether one or more criteria associated with automatic enrollment are satisfied comprises determining whether a valid identifier is associated with the transaction information.

20. The method of claim 1, wherein providing the customer interface includes providing an interface to obtain additional customer information to associated with an automatically assigned customer loyalty number.

21. The method of claim 1, wherein receiving transaction information comprises receiving transaction information for a money transfer.

22. The method of claim 1, wherein receiving transaction information comprises receiving transaction information for the purchase of one or more airline tickets.

23. The method of claim 1, wherein receiving transaction information comprises receiving transaction information for a retail transaction for a sale of goods.

24. The method of claim 1, further comprising completing the transaction initiated by the customer substantially contemporaneously with the initiating step.

25. A method comprising:
    providing, with a loyalty program host, a customer interface to loyalty program information;
    receiving, at the loyalty program host, transaction information for a transaction initiated by a customer, the customer having a previously registered account relationship with an account provider;
    determining, with the loyalty host, the transaction information does not include a customer loyalty number associated with a loyalty program;
    obtaining, with the loyalty host, a customer identifier to identify the customer from the transaction information; and
    automatically enrolling, with the loyalty host, the customer in the loyalty program using the customer identifier,
    wherein automatically enrolling the customer in the loyalty program includes issuing the customer a first customer loyalty number, and providing the customer interface includes providing an interface to link the first customer loyalty number with a second customer loyalty number.

26. The method of claim 25, wherein automatically enrolling the customer comprises:
    generating a loyalty account number for the customer; and
    associating the loyalty account number with the customer identifier.

27. The method of claim 26, wherein automatically enrolling the customer comprises using at least a portion of the customer identifier as a loyalty account number for the customer.

28. The method of claim 26, wherein obtaining the customer identifier comprises obtaining a phone number included in the transaction information.

29. The method of claim 26, wherein obtaining the customer identifier comprises obtaining one of a credit card account number, a debit card account number, and a checking account number.

30. The method of claim 25, further comprising completing the transaction initiated by the customer substantially contemporaneously with the automatically enrolling step.

31. A system comprising:
    a communications interface, to receive transaction information for a transaction initiated by a customer, the customer having a previously registered account relationship with an account provider;
    logic, communicatively coupled with the communications interface, to administer a loyalty program and to use the transaction information to determine if one or more criteria are satisfied using the transaction information and to automatically enroll the customer in the loyalty program if the one or more criteria are satisfied and to provide an interface to link a first customer loyalty number associated with the loyalty program with a second customer loyalty number; and
    a data store, communicatively coupled with the logic, to store loyalty account information for a plurality of customers.

32. The system of claim 31, wherein the logic is further to obtain a customer identifier from the transaction information and to use the customer identifier to automatically enroll the customer.

33. The system of claim 31, wherein the logic is to determine at least one of the criteria is satisfied if the transaction qualifies for automatic enrollment.

34. The system of claim 31, wherein the logic is to determine at least one of the criteria is satisfied if a valid customer identifier is associated with the transaction information.

35. The system of claim 31, wherein the logic is further to complete the transaction initiated by the customer substantially contemporaneously with automatically enrolling the customer in the loyalty program.

36. At least one machine-readable medium, having stored thereon sequences of instructions, which, when executed by the machine, cause the machine to perform the actions of:
- providing, with a loyalty program host, a customer interface to loyalty program information;
- receiving, at the loyalty program host, transaction information for a transaction initiated by a customer, the customer having a previously registered account relationship with an account provider;
- determining whether the transaction information includes a customer loyalty number associated with a loyalty program; and
- initiating, at the loyalty program host, a loyalty enrollment process to automatically enroll the customer in the loyalty program if the transaction information does not include the customer loyalty number,
- wherein providing the customer interface includes providing an interface to link the customer loyalty number with a second customer loyalty number.

37. The machine-readable medium of claim 36, further comprising instructions, which, when executed by the machine, cause the machine to perform the further actions of:
- determining if one or more criteria associated with automatic enrollment are satisfied; and
- if the one or more criteria are satisfied, automatically enrolling the customer in the loyalty program.

38. The machine-readable medium of claim 36, further comprising instructions, which, when executed by the machine, cause the machine to perform the further actions of completing the transaction initiated by the customer substantially contemporaneously with initiating the loyalty enrollment process.

39. At least one machine-readable medium, having stored thereon sequences of instructions, which, when executed by the machine, cause the machine to perform the actions of:
- providing, with a loyalty program host, a customer interface to loyalty program information;
- receiving, at the loyalty program host, transaction information for a transaction initiated by a customer, the customer having a previously registered account relationship with an account provider;
- determining, with the loyalty host, the transaction information does not include a customer loyalty number associated with a loyalty program;
- obtaining, with the loyalty host, a customer identifier to identify the customer from the transaction information; and
- automatically enrolling, with the loyalty host, the customer in the loyalty program using the customer identifiers,
- wherein automatically enrolling the customer in the loyalty program includes issuing the customer a first customer loyalty number, and providing the customer interface includes providing an interface to link the first customer loyalty number with a second customer loyalty number.

40. The machine readable medium of claim 39, wherein the instructions for obtaining the customer identifier comprise instructions, which, when executed by the machine, cause the machine to perform the actions of obtaining one of a credit card account number, a debit card account number, or a checking account number from the transaction information.

41. The machine readable medium of claim 39, wherein the instructions for obtaining the customer identifier comprise instructions, which, when executed by the machine, cause the machine to perform the actions of obtaining a phone number from the transaction information.

42. The machine-readable medium of claim 39, further comprising instructions, which, when executed by the machine, cause the machine to perform the further actions of completing the transaction initiated by the customer substantially contemporaneously with automatically enrolling the customer in the loyalty program.

* * * * *